Nov. 13, 1934.  H. M. E. SACHS  1,980,880
MULTIFOCAL LENS
Filed May 9, 1932
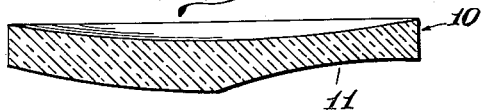
Fig. 1.
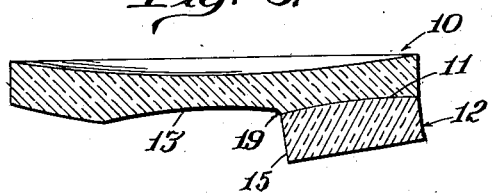
Fig. 2.
Fig. 3.
Fig. 4.
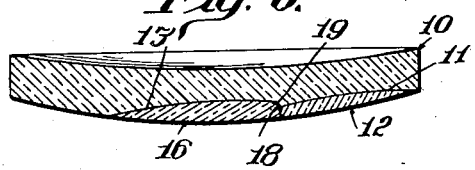
Fig. 6.
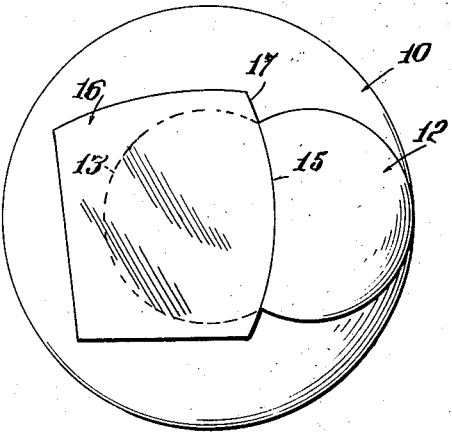
Fig. 5.
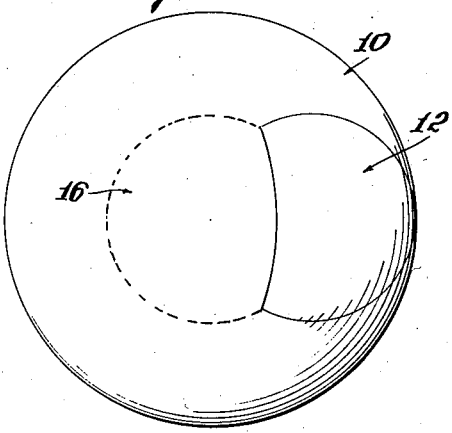
Fig. 7.
Inventor
Henry M. E. Sachs,
By George Heidman
Attorney
Witnesses
Milton Lenoir
J. A. Florell Patented Nov. 13, 1934

1,980,880

UNITED STATES PATENT OFFICE 1,980,880

MULTIFOCAL LENS

Henry M. E. Sachs, South Bend, Ind., assignor of one-half to Robert Malcom, Chicago, Ill.

Application May 9, 1932, Serial No. 610,088

3 Claims. (Cl. 88—54)

My invention relates to the construction of a multifocal optical lens involving a reading or near vision portion and the purpose is to provide a bifocal lens adapted to overcome the serious objections to the usual bifocal lens due to the decided differences in the refractive qualities or indices of the different portions or regions of the lens caused by the abrupt step from one region to the other. That is to say, my invention contemplates a lens of the bifocal type wherein the abrupt step is eliminated or reduced; the lens involving a major portion suitable for distance or general vision and a portion adapted for near vision which is integrally secured in a predetermined part of the major portion, in conjunction with a segmental portion adjacent thereto so as to provide a more or less gradual step or somewhat blending refractive relation at the juncture of the different segments or portions of the lens.

The objects and advantages of my invention will be readily comprehended from the following detailed description of the accompanying drawing, wherein—

Figure 1 is a transverse sectional view of the main lens blank provided with a countersink.

Figure 2 is a similar view with the countersink provided with an added disc or glass "button".

Figure 3 is a similar view showing the lens-blank provided with a second countersink and the first disc or glass "button" partially ground away.

Figure 4 illustrates the application of a second "button" in the second countersink.

Figure 5 is a face or plan view of the blank with the two discs or glass "buttons" applied as in Figure 4.

Figure 6 is a transverse sectional view of the finished lens.

Figure 7 is a plan view thereof.

Considerable objection has been found to bifocal lenses as heretofore made because of the decided "jump" at the juncture of the distance vision and near vision regions of the lens caused by these regions having refractive qualities of a decided dissimilar power, with the result that the marked line or decided "jump" in displacement of the object causes considerable eye strain.

The purpose of my invention is to provide a multifocal lens adapted to overcome this serious difficulty and to provide a lens wherein the juncture between the distance vision and near vision regions of the lens will be of such a nature as to reduce this decided difference and provide a somewhat gradual approaching or blending region.

In the making of my improved lens, the lens-blank 10, at a predetermined point, namely preferably intermediate of the geometrical center or axis and the perimeter and on the convexed side of the lens-blank, is provided with a predetermined countersink or recess, as shown at 11 in Figure 1. The countersink 11 is formed so as to provide a concaved recess having its greatest depth somewhat removed at a point intermediate of the perimeter of the countersink. The grinding of the countersink 11 in a multiple of lens-blanks may be simultaneously accomplished by the use of a suitable concaved block and suitable grinding tool. After the lens-blanks have been provided with a proper countersink, as at 11, the countersink is then provided with a suitable glass disc or "button" 12 having a convexed side corresponding to the concavity of the countersink; the depth of the recess and therefore the radius of the "button" being in keeping with the refractive quality desired in the near vision region of the lens.

The "button" 12, of preselected index of refraction and therefore of greater power than the major portion of the lens-blank, is intimately secured to the blank or fused in place to form an integral structure.

The lens-blank 10, with the integrally secured "button" 12, is then again placed in a suitable rotating block and the lens-blank with the "button" positioned so that a suitable grinding tool may operate on the convexed side of the lens-blank 10 in order to provide a second countersink 13 of a predetermined radius arranged to lap the adjacent perimeter of the added "button" 12 so that the added "button" 12 may have a portion ground away in the arcuate manner, more clearly shown in Figure 5, and thus provide an abutting shoulder or portion 15 for a second "button" 16 having an arcuate side 17 adapted to fit the curved shoulder 15 formed in the first "button" 12.

This second "button" 16 has a convexed lower face adapted to match the concaved recess of countersink 13, and this second "button", like the first "button", is then intimately secured or fused in place.

The second countersink 13 is preferably of the same depth and radius as the first countersink.

The first "button", which is generally of flint glass, has a refractive index greater than the refractive quality of the main blank; while the second "button" 16, which may be crown glass, may have the same refractive quality as that of the main blank 10.

In order to obviate objectionable reflection and the objectionable "jump" heretofore encountered, the arcuate perimeter 17 of the second "button" is left unpolished; and the second "button" 16 on the lower edge of its perimeter 17 is given a slight bevel or curvature as at 18 to match the bevel in the countersink 13 adjacent to the first or flint "button" 12, as shown at 19.

The blank, with the second "button", is then ground so that the protruding portions of the "buttons" may be ground down flush with the surface of the main blank to provide the smooth convexed surface or face of the completed lens-blank, as shown in Figures 6 and 7; the junctures between the blank and "buttons", after the composite blank has been properly polished, being practically invisible.

By providing the lens with the second segment or "button" of predetermined radius and convexity, having an unpolished abutting perimeter and bevel or curvature at the lower edge of the abutting perimeter, the reflective tendency at the juncture between the main blank and added segment as in lenses as at present employed, is eliminated; a somewhat blending effect is provided between the distance vision region and the near vision region, and as a result the finished lens will not have the decided "step" or pronounced "jump" heretofore encountered in bifocal lenses.

The specific embodiment of the invention, as shown in the drawing and herein described, has been employed as an exemplification of the invention, described in terms employed for the purposes of description and not as terms of limitation.

What I claim is:

1. An optical lens comprising a major portion of a preselected index of refraction; a minor portion of a different index of refraction embedded in the major portion; and a third portion having an index of refraction different from the minor portion and embedded in the major portion in abutting relation with the perimeter of the minor portion, the juncture between the minor and third portions defining the arc of a circle, with the abutting perimeter of the third portion having an unpolished surface and said third portion at the lower edge of its perimeter abutting the minor portion being provided with a surface sloping from the minor portion and disposed in a plane beneath that of the adjacent part of the minor portion.

2. An optical lens involving a major portion; a minor portion of preselected refractive index different from that of the major portion and intimately embedded therein; and a third portion of preselected refractive index embedded in the major portion in abutting relation with and arcuately extending into the minor portion to a point intermediate of the perimeter of the minor portion and its axis, the inner edge of the third portion at its juncture with the minor portion sloping toward the bottom surface of said third portion and disposed in a plane beneath that of the adjacent portion of the minor portion.

3. An optical lens involving a major portion having a convexed surface provided with a countersink in said surface, a minor portion of preselected refractive index and having a convexed surface matching said countersink and intimately embedded therein; a second countersink in the major portion of substantially the same radius and depth as the first countersink and arranged substantially at the center of the major portion and extending into the adjacent portion of the minor portion in an arcuate manner and formed to provide a bevel adjacent to the juncture with the minor portion at the base thereof; and a third portion of preselected refractive index having a convexed surface embedded in said second countersink with its perimeter in abutting relation with and arcuately extending into the minor portion to a point intermediate of the perimeter of the minor portion and its center, the perimeter of the third portion abutting the minor portion being unpolished and sloping toward the bottom surface of said third portion.

HENRY M. E. SACHS.